United States Patent [19]

Hong

[11] Patent Number: 5,893,066
[45] Date of Patent: Apr. 6, 1999

[54] FAST REQUANTIZATION APPARATUS AND METHOD FOR MPEG AUDIO DECODING

[75] Inventor: Kicheon Hong, Cupertino, Calif.

[73] Assignee: Samsung Electronics Co. Ltd., Seoul, Rep. of Korea

[21] Appl. No.: 732,543

[22] Filed: Oct. 15, 1996

[51] Int. Cl.⁶ .............................. G10L 9/00; G06F 13/00
[52] U.S. Cl. ...................... 704/500; 704/229; 704/230; 395/800
[58] Field of Search ................................... 704/229, 230, 704/500; 395/800

[56] References Cited

U.S. PATENT DOCUMENTS

| | | | |
|---|---|---|---|
| 5,418,973 | 5/1995 | Ellis et al. | 395/800 |
| 5,517,666 | 5/1996 | Ohtani et al. | 395/800 |
| 5,576,765 | 11/1996 | Cheney et al. | 348/407 |
| 5,649,053 | 7/1997 | Kim | 704/229 |
| 5,673,289 | 9/1997 | Kim et al. | 375/243 |
| 5,675,703 | 10/1997 | Sato | 704/230 |

*Primary Examiner*—David R. Hudspeth
*Assistant Examiner*—Susan Wieland
*Attorney, Agent, or Firm*—Skjerven, Morrill, MacPherson, Franklin & Friel L.L.P.; Ken J. Koestner

[57] ABSTRACT

An audio decoder in a multimedia processor improves decoding efficiency and performance through the usage of multiple parallel processors including a scalar processor and a vector processor. The scalar processor most efficiently performs tasks including bit manipulation, indexing and conditional operations. The vector processor most efficiently performs operations involving multiple data calculations, operating on unconditional, sequential data. Improved performance is achieved by executing as many operations as possible on the vector processor, rather than the scalar processor, so long as the data is sequential data. The audio decoder includes a requantization program code that shifts data handling operations from the scalar processor to the vector processor through the conversion of nonsequential data to sequential data, thereby "vectorizing" the data.

40 Claims, 11 Drawing Sheets

FAST REQUANTIZATION APPARATUS AND METHOD FOR MPEG AUDIO DECODING

BACKGROUND OF THE INVENTION

1. Field of the Invention

The present invention relates to an audio decoding apparatus and method under the MPEG standard. More specifically, the present invention relates to an audio decoding apparatus and operating method for usage in a multiple-processor multimedia system including a scalar processor and a vector processor.

2. Description of the Related Art

Standardization of recording media, devices and various aspects of data handling, such as audio recording, storage and playback, is highly desirable for continued growth of this technology and its applications. One compression standard which has attained wide spread use for compressing and decompressing video information is the moving pictures expert group (MPEG) standard for audio and video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 (hereinafter referred to as MPEG International Standard).

The MPEG International Standard addresses the problem of combining one or more data streams from video and audio sources with timing information to form a single information stream. Typically massive volumes of information stream data are handled by an MPEG processing system. Although the computing power of processors has advanced steadily and rapidly, the demand for higher processing power and computing efficiency remains unabated due to the development of aggressive new applications in the multimedia field that call for the display and performance of ever larger data quantities.

The MPEG International Standard defines a suitable audio decoding process which is illustrated in FIG. 1. The audio decoding process 10 includes the steps of inputting an encoded bit stream 12, decoding bit allocation bits 14, decoding scale factor selection information 16, requantization of sample data 18, synthesis of a subband filter 20, and outputting of pulse code modulated (PCM) samples 22.

The requantization operation 18 is one of the most computationally intensive operations performed by an MPEG audio decoder.

What is needed is an apparatus and technique that more efficiently performs audio decoding under the MPEG International Standard. More, specifically, what is needed is an apparatus and technique that more efficiently performs requantization of sample data in an audio decoder.

SUMMARY OF THE INVENTION

In accordance with one aspect of the present invention, an audio decoder in a multimedia processor improves decoding efficiency and performance through the usage of multiple parallel processors including a scalar processor and a vector processor. The scalar processor most efficiently performs tasks including bit manipulation, indexing and conditional operations. The vector processor most efficiently performs operations involving multiple data calculations, operating on unconditional, sequential data. Improved performance is achieved by executing as many operations as possible on the vector processor, rather than the scalar processor, so long as the data is sequential data. The audio decoder includes a requantization program code that shifts data handling operations from the scalar processor to the vector processor through the conversion of nonsequential data to sequential data, thereby "vectorizing" the data.

Many advantages are achieved by the described audio decoder system and operating method. The audio decoder advantageously uses two processors in parallel to improve decoding performance. The audio decoder advantageously executes conditional instructions and instructions operating on nonsequential data using a scalar processor and executes instructions operating on arrays and sequential data using a vector processor. The audio decoder improves computational speed performance by conforming nonsequential data to a sequential form so that more operations exploit the computing power of a vector processor.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Operations of multimedia applications including MPEG1, MPEG2, video conferencing, fax support, modem support and the like are efficiently performed using a multiple processor system. One example of a multiprocessor system includes a scalar processor and a vector processor. Audio decoding is an operation that is accelerated through the usage of a multiprocessor system and design of operating procedures to efficiently allocate steps in the decoding process between the scalar processor and the vector processor.

Figure 1:
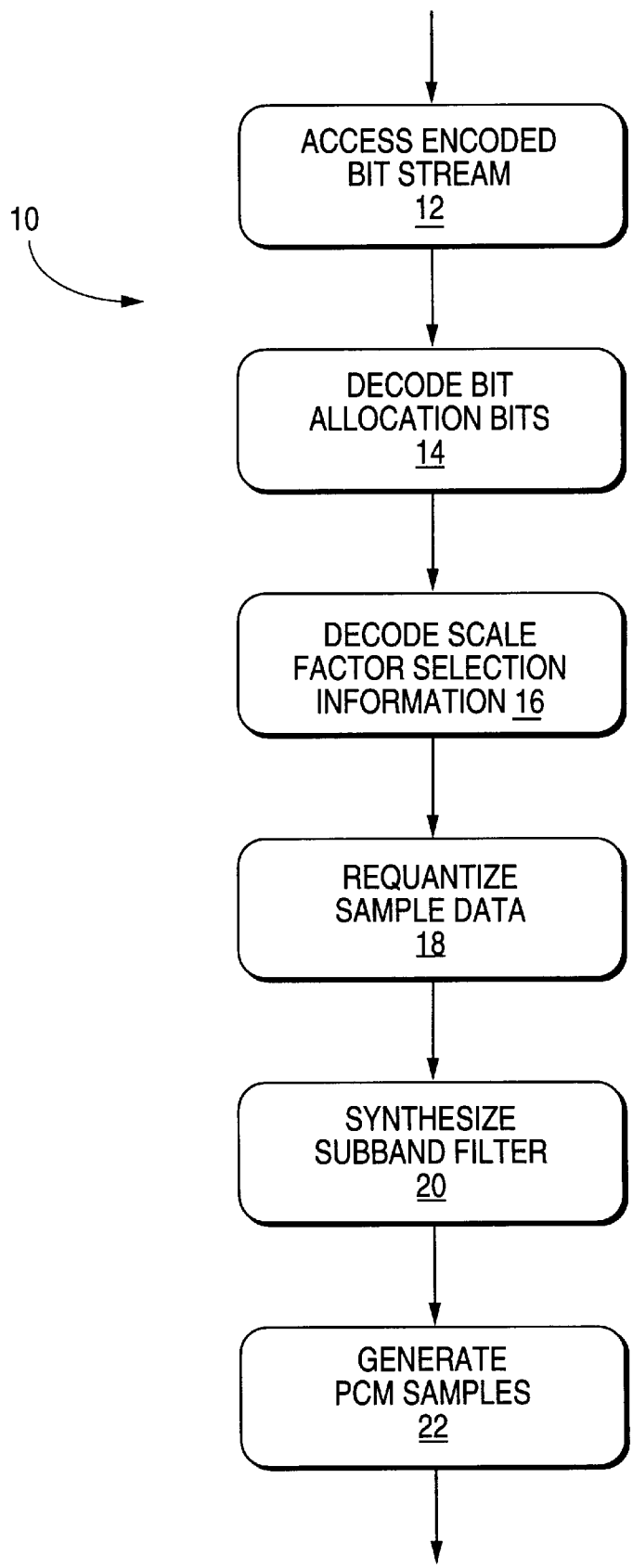
FIG. 1, labeled prior art, is a flow chart showing a procedure for decoding an MPEG audio data stream.
Figure 2:
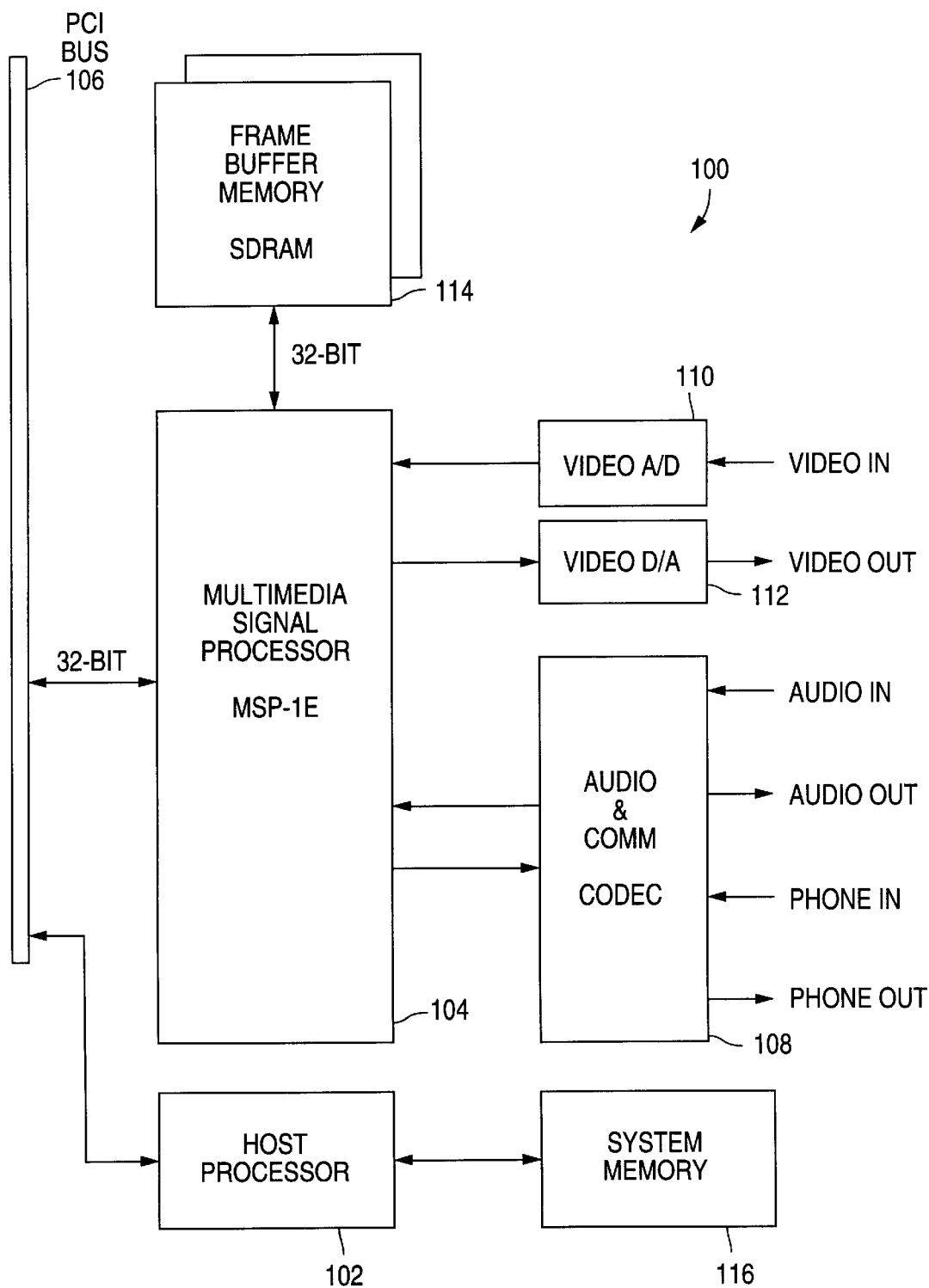
FIG. 2 is a high-level schematic block diagram illustrating a multimedia multiprocessor system in accordance with an embodiment of the present invention.

Referring to FIG. 2 a high-level schematic block diagram illustrates a multimedia multiprocessor system 100 including a host processor 102 and a multimedia signal processor 104. A typical host processor 102 is an x86 processor such as a Pentium™ or Pentium Pro™ processor. The host processor 102 executes programs based on instructions and data held in a system memory 116. The host processor 102 communicates with the multimedia signal processor 104 via a system bus 106 such as a PCI bus. The multimedia signal processor 104 interfaces to various functional blocks such as an audio and communication CODEC 108, a video A/D converter 110, a video D/A converter 112, and a frame buffer SDRAM memory 114.

Figure 3:
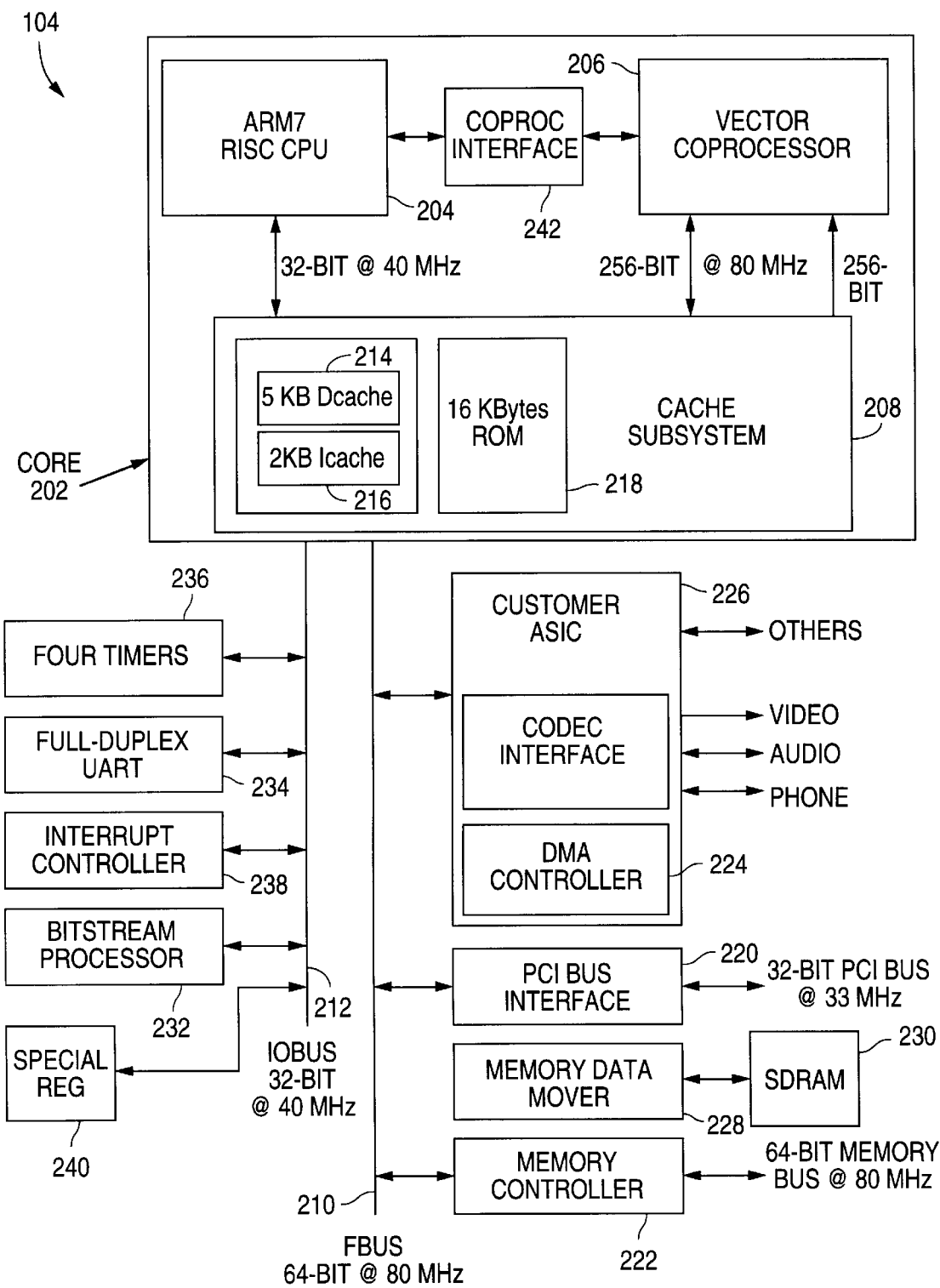
FIG. 3 is a schematic block diagram showing a multimedia signal processor included in the multimedia multiprocessor system illustrated in FIG. 2.

Referring to FIG. 3, a schematic block diagram shows the multimedia signal processor 104 within the multimedia multiprocessor system 100. The multimedia signal processor 104 includes a digital signal processor (DSP) core 202 which is connected to a plurality of multimedia interfaces.

The DSP core 202 is the computation engine of the multimedia signal processor 104 and includes a scalar processor 204, a vector processor 206, a cache subsystem 208, a fast bus (FBUS) 210, and an I/O bus 212. The scalar processor 204 is a scalar processor based on a 32-bit ARM7™ control processor which is designed and manufactured by ARM Limited, Great Britain, and performs general processing functions such as real-time operating system operations, interrupt and exception handling, input/output device management, communication with the host processor 102 and the like. In one embodiment, the scalar processor 204 operates at 40 MHz. The scalar processor 204 interfaces to the vector processor 206 through a coprocessor interface 242.

The multimedia signal processor 104 performs multiple various multimedia operations. One multimedia operation is audio decoding so that the scalar processor 204 and the vector processor 206, in combination with program codes which operate on the processors, form an audio processor 205.

Figure 4:
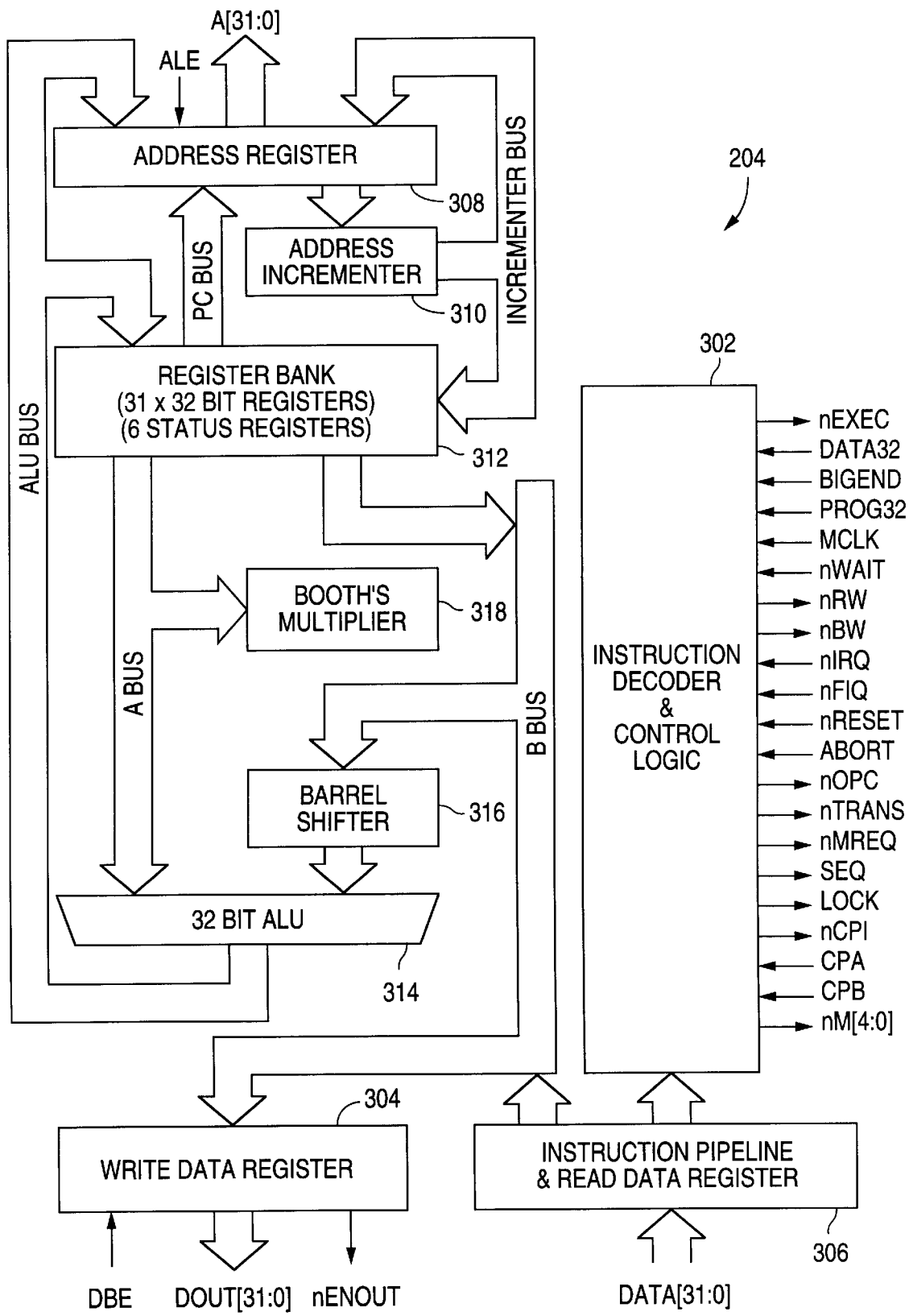
FIG. 4 is a schematic block diagram which illustrates a control processor in the multimedia multiprocessor system.

Referring to FIG. 4, a schematic block diagram illustrates the ARM7 scalar processor 204 which is controlled by an instruction decoder and control logic 302. The scalar processor 204 communicates with the cache subsystem 208 via a write data register 304 and an instruction pipeline and read data register 306. The scalar processor 204 includes an address register 308 and an address incrementer 310 for addressing data in a 31×32-bit register bank 312. The scalar processor 204 includes arithmetic logic such as a 32-bit ALU 314, a barrel shifter 316 and a Booth's multiplier 318. The coprocessor interface 242 is coupled directly to the instruction decoder and control logic 302 via nOPC, nCPI, CPA and CPB signal lines that communicate operation codes and instruction arguments between the scalar processor 204 and the vector processor 206 through the coprocessor interface 242.

Figure 5:
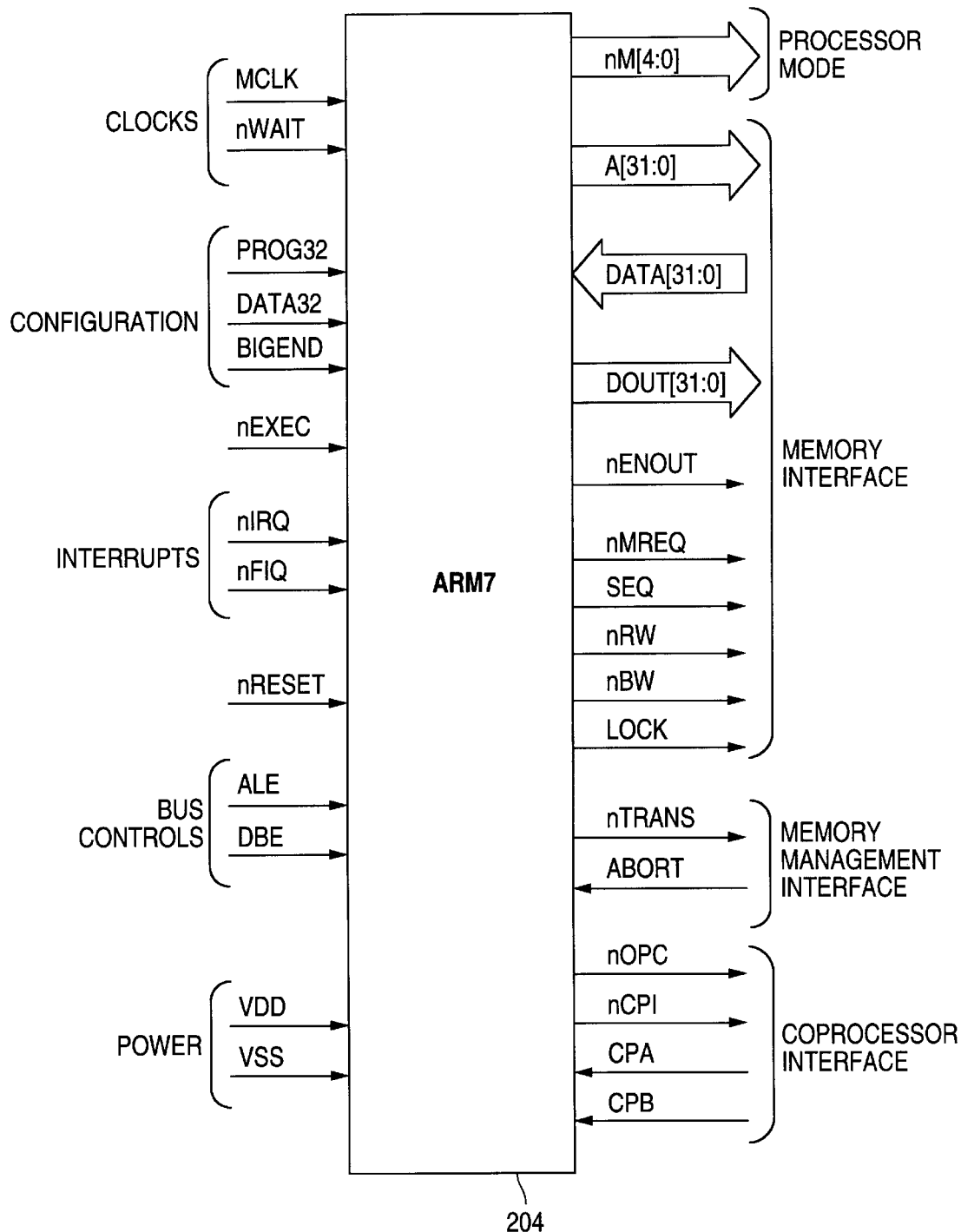
FIG. 5 is a functional diagram of the control processor.

FIG. 5 illustrates a functional diagram of the scalar processor 204. The scalar processor 204 executes scalar operations including indexing and conditional operations. The scalar processor 204 initiates operations of the vector processor 206. Specifically, the scalar processor 204 controls interactions with the vector processor 206 through extensions to the scalar processor 204 instruction set. The instruction set extensions include coprocessor data operations such as a STARTVP and a INTVP instruction, coprocessor data transfers, and coprocessor register transfers, such as a TEST-SET instruction and MFVP, MTVP, MFER and MTER instructions for reading and writing registers of the vector processor 206.

Figure 6:
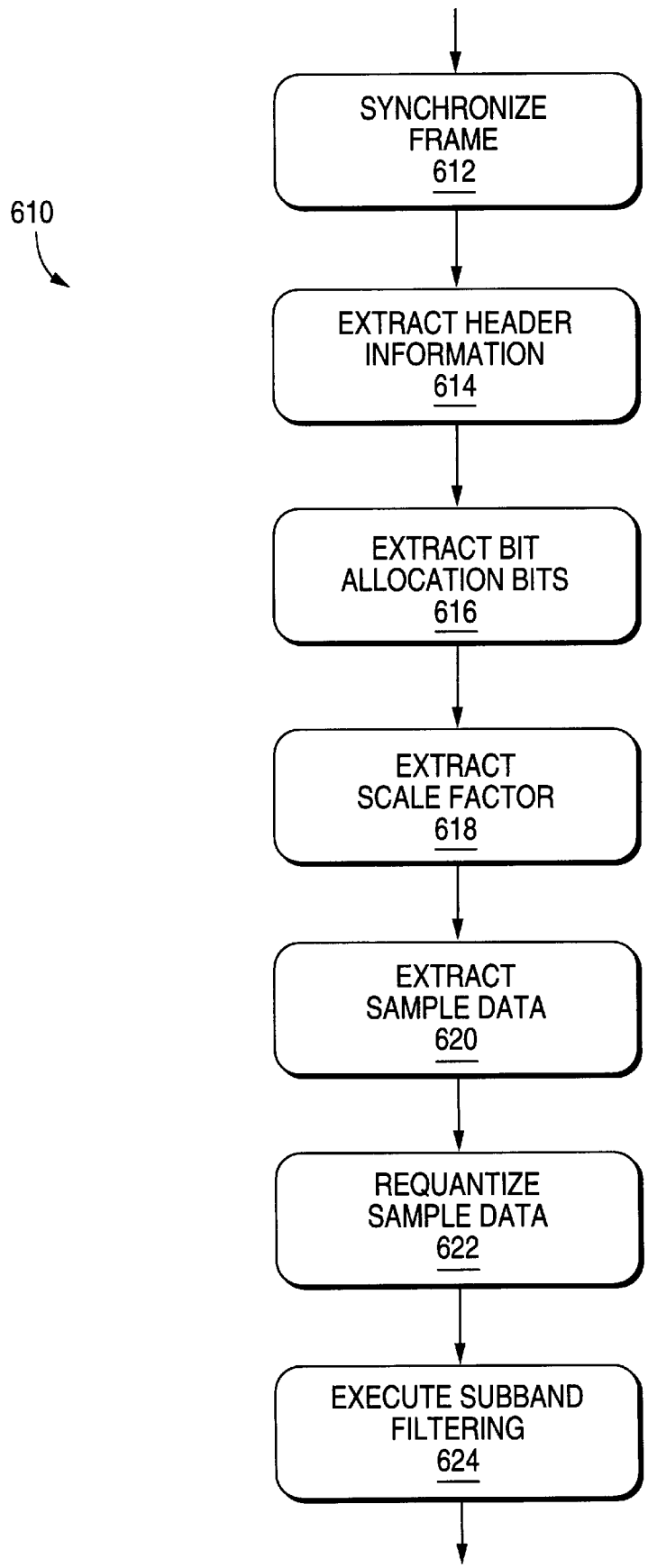
FIG. 6 is a flow chart which illustrates operations of a method for performing MPEG1 audio decoding.

An efficient operation of MPEG decoding operations is advantageously performed by sharing audio decoding operations between the scalar processor 204 and the vector processor 206 to exploit the advantages of each processor type. FIG. 6 is a flow chart which illustrates operations of a method for performing MPEG1 audio decoding 610. The scalar processor 204 shown in FIG. 2 is assigned to perform operations involving bit manipulation, indexing and conditional operations of the MPEG audio decoder including operations of frame synchronization 612, and extraction of information from the MPEG signal stream, including extraction of header information 614, extraction of bit allocation bits 616, extraction of scalefactor selection information and a scalefactor 618, and extraction of sample data 620. The scalar processor 204 also is assigned to execute an operation of requantizing sample data 622. The vector processor 206 is assigned to perform multiple-data calculations operating on the MPEG data stream, including the execution of subband filtering 624 which is highly suitable for vector processors and has a large calculation load requirement.

The scalar processor 204 performs the frame synchronization operations and extraction of header information and bit allocation bits. Upon extraction of 6 bits of coded scalefactors from the bitstream, the scalar processor 204 begins reading coded samples. The frame synchronization 612 operation synchronizes the audio processor 205 to an incoming bitstream. At startup of the audio decoding process, frame synchronization 612 typically is performed by searching the bitstream for a 12-bit syncword. The extraction of header information 614 accesses header information including ID, layer and protection status information. If the header information is already known, the extraction of header information 614 routine accesses the first 16 bits of the header for usage as a 16-bit syncword for more reliable synchronization. The extraction of bit allocation bits 616 operation typically accesses entries of a plurality of multiple bit-allocation tables. The specific entries are selected based on bitrate and sampling frequency of the bitstream signal. Decoding of the bit allocation table is typically performed using a three-step approach in which: (1) A "nb" value designating the number of bits allocated to a sample in a sub-band is read and placed in a second column of a bit allocation table. (2) The number accessed in the first step and the current sub-band number are used to point to a value in the table representing the number of levels used to quantize the samples in the sub-band. (3) Using a table of quantization classes, the number of bits used to code the quantized samples, and the requantization coefficients are determined. Also in step three, whether codes for three consecutive sub-band samples are grouped into one code is determined. Some high sub-bands never have bits allocated. The number of the lowest sub-band that does not have bits allocated is assigned to the identifier "sblimit".

The extraction of scalefactor selection information and a scalefactor 618 operation reads scalefactor information from the bitstream for sub-bands that have a nonzero bit allocation. One sub-band includes 36 samples within a frame. The 36 samples in one sub-band are divided into three equal parts of 12 sub-band samples. The scalefactor information indicates the number of scalefactors that are transmitted. For every sub-band with a nonzero bit allocation, the coded scalefactors for that sub-band are read accessed from the bitstream. The scalefactor information is coded into six bits and designated an unsigned integer index into a scalefactor table. The scalefactor table supplies the scalefactor by which the sub-band samples are to be multiplied after requantization.

In the requantizing sample data 622 operation, coded samples are read from the bitstream. The coded samples are in the form of "triplets" in which the code contains three consecutive samples simultaneously. A table storing "classes of quantization" information indicates the number of bits to be read for one triplet from the bitstream for each sub-band. The table also indicates whether a code includes three consecutive separable codes or one combined code for a group of three samples. In the case of a code designating a group of three samples, the combined code is regarded as an unsigned integer (c) and an algorithm supplies the three separate codes s[0], s[1], and s[2] as follows:

$$\text{for } (i = 0; i < 3; i\text{++}) \{$$
$$s[i] = c \% \text{ nlevels}$$
$$c = c \text{ DIV nlevels}$$
$$\}$$

where nlevels is the number of steps of an MPEG table B.2 "Layer II bit allocation table".

The coded samples are arranged in triplets in which the code contains three consecutive samples simultaneously. The three samples of a triplet is degrouped and, after the degrouping operation, requantized data is obtained by applying a standard MPEG linear formula, as follows:

$$s'' = \frac{2^{nb}}{2^{nb}-1} * (s''' + 2^{-nb+1}),$$

where s''' is a fractional number, s'' is a requantized value, and nb is the number of bits allocated to samples in the subband.

The requantizing sample data 622 operation is one of the most computationally intensive operations performed by the MPEG audio decoder. One technique for performing requantization of sample data is illustrated by the following "C" language program code. In the illustrative program code, sb designates a sub-band, bound is the lowest sub-band which uses intensity stereo coding, sblimit is the lowest sub-band which uses stereo coding (see MPEG International Standard, Part III, Table B.2a–Table B.2d), nb is the number of bits assigned to each sub-band, and scalefactor[ch][sb][z] is a scalefactor coefficients index (see MPEG International Standard, Part III, Table B.1). The 36 samples in one subband within a frame are divided into three equal parts of 12 subband samples. Each part may have a separate scalefactor. Therefore, three scalefactors exist having an index(Z) is either 0, 1, or 2, depending on the iteration number of a group, gr. The number Z is defined so that Z is zero if gr is less than 4. Z is one if gr ranges from 4 to less than 8. Otherwise Z is two. C2[nb] and D2[nb] designate layer II classes of quantization coefficients C and D (see MPEG International Standard, Part III, Table B.4), sample[s][ch][sb] is an array of degrouped audio sample data, and desample[s][ch][sb] is an array of requantized audio sample data. The following program code includes several [NOTE n] markings which are indicative of program codes that are modified in a subsequently discussed embodiment of a requantization operation. The program code for a requantization operation of an audio decoding operation is set forth in TABLE I, as follows:

TABLE I

```
for(sb=0; sb<bound; sb++) {
    for(ch=0; ch<stereo; ch++) {
        if(bit_alloc[ch][sb]);
            nb=bit_alloc[ch][sb];
            factor=sf[scalefactor[Z][ch][sb];      [NOTE 1]
            C=C2[nb];                              [NOTE 2]
            D=D2[nb];
            for(s=0; s<3; s++) {
                if(((sample[s][ch][sb]>>nb-1)&1)==1)  [NOTE 3]
                    fraction=0.0;
                else
                    fraction=-1.0;
                }
                fraction+=(double)(sample[s][ch][sb]&   [NOTE 4]
                    (1 L<<nb-1))/(double)(1L<<nb-1);
                desample[s][ch][sb]=(double)(fraction+D)*C*factor;
            } else {
                desample[0][ch][sb]=0.0;
                desample[1][ch][sb]=0.0;
                desample[2][ch][sb]=0.0;
            }
        }
}
for(sb=bound; sb<sblimit; sb++) {
    if(bit_alloc[0][sb]) {
        nb=bit_alloc [0][sb];
        factor_L=sf[scalefactor[Z][0][sb];
        factor_R=sf[scalefactor[Z][1][sb];
        C=C2[nb];
        D=D2[nb];
        for(s=0; s<3; s++) {
            if(((sample[0][ch][sb]>>nb-1)&1)==1)
                fraction=0.0;
            else
                fraction=-1.0;
            }
            fraction+=(double)(sample[s][0][sb]&
                (1L<<nb-1))/(double)(1L<<nb-1);
            desample[s][0][sb]=(double)(fraction+D)*C*factor_L;
            desample[s][1][sb]=(double)(fraction+D)*C*factor_R;
        } else {
            desample[0][0][sb]=0.0;
            desample[0][1][sb]=0.0;
            desample[1][0][sb]=0.0;
            desample[1][1][sb]=0.0;
            desample[2][0][sb]=0.0;
            desample[2][1][sb]=0.0;
        }
    }
}
for(sb=sblimit; sb<32; sb++) {
    desample[0][0][sb]=0.0;
    desample[0][1][sb]=0.0;
    desample[1][0][sb]=0.0;
    desample[1][1][sb]=0.0;
    desample[2][0][sb]=0.0;
    desample[2][1][sb]=0.0;
}
```

The audio decoder program code illustrated in TABLE I performs a requantization calculation for data in groups of three samples. The three samples in a group are included in the same sub-band of 32 sub-bands. The audio sample requantization operation of the audio decoder program code depicted in TABLE I is performed in the scalar processor 204 since the requantization operation includes index operations and conditional operations that are efficiently performed by a scalar-type processor. Furthermore, the layer II classes of quantization coefficients C and D are determined dependent on the number of bits assigned to each sub-band (the parameter nb) and are therefore not available as a sequential data.

Additional improvements may be gained in audio decoding. Most requantization operations may be advantageously performed on the vector processor 206 upon appropriate modification of various instructions of the audio decoder program code. These modifications generally transform data in a nonsequential form into a sequential format data in a vectorization process.

One modification is entered at the position of [NOTE 1] in the program code illustrated in TABLE I. The expression, factor=sf[scalefactor[Z][ch][sb], is indicative of a scalefactor index in which Z is the number of a group, ch is the channel number, and sb indicates the sub-band number. In a vectorized embodiment of the audio decoding operation, the scalefactor index is extracted from the bitstream in the step of extracting scalefactor selection information and the scalefactor 618. The plurality of scalefactor coefficients is directly calculated based on the scalefactor index and placed into the array scalefactor[Z][ch][sb] during the step of extracting scalefactor selection information and the scalefactor 618. TABLE IIA illustrates a program code for inclusion in the step of extracting scalefactor selection information and the scalefactor 618, which is performed by the scalar processor 204 prior to the requantization step 622.

TABLE IIA

```
map=BITMAP;
scalefactor[z][ch][sb]=sf[map];
``` where map is the scalefactor index from the bitstream, BITMAP is a 6-bit designation of a bit stream file, and sf[ ] is a 63-element scalefactor coefficients array. Performance of the instructions in TABLE IIA during the step of extracting scalefactor selection information and the scalefactor 618 transforms the data in the array scalefactor[z][ch][sb] into sequential data which is dependent upon sub-band number rather than on bit index operation.

Another modification is entered at the position of [NOTE 2] in the program code illustrated in TABLE I. The expressions, C=C2[nb] and D=D2[nb], designate quantization coefficients that are calculated at every iteration but are common to each sub-band. TABLE IIB illustrates a program code for inclusion in the step of extracting scalefactor selection information and the scalefactor 618, which is performed by the scalar processor 204 prior to the requantization step 622. The program code shown in TABLE IIB is performed only one time during each one frame reconstruction. The data in each array becomes exclusively sequential data which corresponds to the index of the channel and the sub-band number. The data is no longer related to the index of the bit allocation after the program code shown in TABLE IIB has completed execution.

TABLE IIB

```
for(ch=0; ch<stereo; ch++)
    for(sb=0; sb<min(bound,sblimit); sb++)
        if(nb=bit_alloc[ch][sb] {
            Q[ch][sb]=1L<<nb-1;
            C[ch][sb]=C2[nb];
            D[ch][sb]=D2[nb]
        } else {
            Q[ch][sb]=0;
            C[ch][sb]=0;
            D[ch][sb]=0;
        }
    for(sb=bound; sb<sblimit; sb++) {
        if(nb=bit_alloc[0][sb] {
            Q[0][sb]=1L<<nb-1;
            Q[1][sb]=Q[0][sb];
            C[0][sb]=C2[nb];
            C[1][sb]=C[0][sb];
            D[0][sb]=D2[nb];
            D[1][sb]=D[0][sb];
```

TABLE IIB-continued

```
        } else {
            Q[0][sb]=0;
            Q[1][sb]=0;
            C[0][sb]=0;
            C[1][sb]=0;
            D[0][sb]=0;
            D[1][sb]=0;
        }
    }
    for(sb=sblimit; sb<32; sb++) {
        Q[0][sb]=0;
        Q[1][sb]=0;
        C[0][sb]=0;
        C[1][sb]=0;
        D[0][sb]=0;
        D[1][sb]=0;
    }
``` where Q[ch][sb] is a mask function and C[ch][sb] and D[ch][sb] are arrays holding requantization coefficients data.

Another modification is entered at the position of [NOTE 3] in the program code illustrated in TABLE I. The expressions for calculating fractions, including setting of "fraction" to either 0.0 or −1.0 then determining "fraction" by the equation in the step of extracting sample data 620, as follows:

$$\text{fraction} += (\text{double})(\text{sample}[s][ch][sb] \,\&\, (1L<<nb-1))/(\text{double})(1L<<nb-1),$$

are performed by including the program code shown in TABLE IIC into the step of requantizing sample data 622, as follows:

TABLE IIC

```
for(sb=0; sb<min(bound, sblimit); sb++) {
    for(ch=0; ch<stereo; ch++) {
        if((nb=bit_alloc[ch][sb]==0) {
            sample[0][ch][sb]=0;
            sample[1][ch][sb]=0;
            sample[2][ch][sb]=0;
        } else {
            map=BITMAP(nb);
            sample[s][ch][sb]=(int)(map&(Q[ch][sb]-1));
            if(((map>>nb-1)&1)!=1) {
                sample[s][ch][sb]-=Q[ch][sb];
            }
        }
    }
}
for(sb=bound; sb<sblimit; sb++) {
    if((nb=bit_alloc[0][sb]==0) {
        sample[0][0][sb]=0;
        sample[1][0][sb]=0;
        sample[2][0][sb]=0;
        sample[0][1][sb]=0;
        sample[1][1][sb]=0;
        sample[2][1][sb]=0;
    } else {
        for(s=0; s<3; s++) {
            map=BITMAP(nb);
            sample[s][0][sb]=(int)(map&(Q[0][sb]-1));
            sample[s][1][sb]=sample[s][0][sb];
            if(((map>>nb-1)&1)!=1) {
                sample[s][0][sb]-=Q[0][sb];
                sample[s][1][sb]=sample[s][0][sb];
            }
        }
    }
}
for(sb=bound; sb<sblimit; sb++) {
    sample[0][0][sb]=0;
    sample[1][0][sb]=0;
    sample[2][0][sb]=0;
```

TABLE IIC-continued

```
    sample[0][1][sb]=0;
    sample[1][1][sb]=0;
    sample[2][1][sb]=0;
}
```

Several advantageous modifications have been made to the audio decoder program code shown in TABLE I. For example, in the step of extracting sample data 620, the divide operation:

fraction+=(double)(sample [s][ch][sb]& (1L<<nb-1))/
(double)(1L<<nb-1), is avoided in the program code shown in TABLE IIC. In the modified requantization operation, the sample[s][ch][sb] is not divided by 1L<<(nb-1)(=Q[ch][sb]) in the resynchronization steps executed by the scalar processor 204. Instead, the division operation is performed in the sub-band filtering step 624 by the vector processor 206.

Program code operations shown in TABLE III are added before the synthesis sub-band filtering step 624 so that most of the requantization operation is efficiently executed in the vector processor 206 since all quantization coefficient data in arrays C[ch][sb], D[ch][sb], scalefactor [s][ch][sb], and masking data in Q[ch][sb] all are transformed from nonsequential data to sequential data.

TABLE III

```
for (ch=0; ch<stereo, ch++) {
    for (sb=0; sb<32; sb++) {
        desample[s][ch][sb]=(sample[s][ch][sb]/Q[ch][sb]+D[ch][sb]*
                                                    C[ch][sb]*scalefactor[s][ch][sb]
    ;
where s is the number of a group.
```

Figure 7:
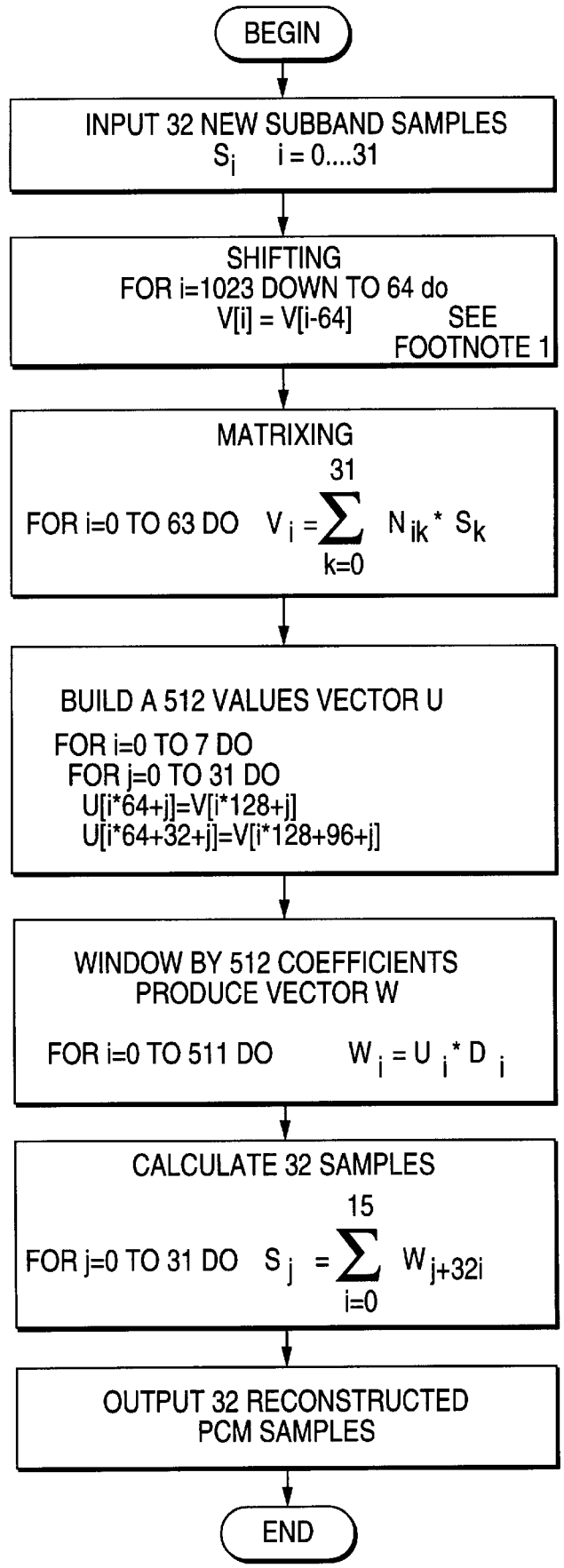
FIG. 7 is a flow chart which illustrates operations of a suitable method for performing sub-band filtering.

The subband filtering 624 operation is executed in the vector processor 206. If a particular sub-band is not allocated any bits, the subband filtering 624 operation sets the samples in the sub-band to zero. Following each calculation of all 32 channels of a single sub-band, the sample values are applied to a synthesis sub-band filter and 32 consecutive audio samples are calculated using the method illustrated in the flow chart shown in FIG. 7. Coefficients $N_{ik}$ for the matrixing operation are given by the equation, as follows:

$$N_{ik} = \cos\left[(16+i)(2k+1)\frac{\pi}{64}\right].$$

The coefficients $D_i$ for the windowing operation are defined by the MPEG International Standard in a "Coefficients $D_i$ of the synthesis window" table.

Referring again to FIG. 3, the vector processor 206 is the digital signal processing engine of the multimedia signal processor 104. The vector processor 206 has a Single-Instruction Multiple-Data architecture and includes a pipelined RISC engine that operates on multiple data elements in parallel to perform signal processing functions such as Discrete Cosine Transforms (DCT), FIR filtering, convolution, video motion estimation and other processing operations. The vector processor 206 supports vector arithmetic in which multiple data elements are operated upon in parallel, in the manner of a vector process, by a plurality of vector execution units. The vector processor 206 executes both scalar operations and combined vector-scalar operations. The multiple data elements of the vector processor 206 are packed in a 576-bit vector which is computed at a rate of thirty-two 8/9-bit fixed-point arithmetic operations, sixteen 16-bit fixed-point arithmetic operations, or eight 32-bit fixed-point or floating point arithmetic operations per cycle (for example, 12.5 ns). Most 32-bit scalar operations are pipelined at a rate of one instruction per cycle while most 576-bit vector operations are pipelined at a rate of one instruction in two cycles. Load and store operations are overlapped with arithmetic operations and are executed independently by separate load and store circuits.

Figure 8:
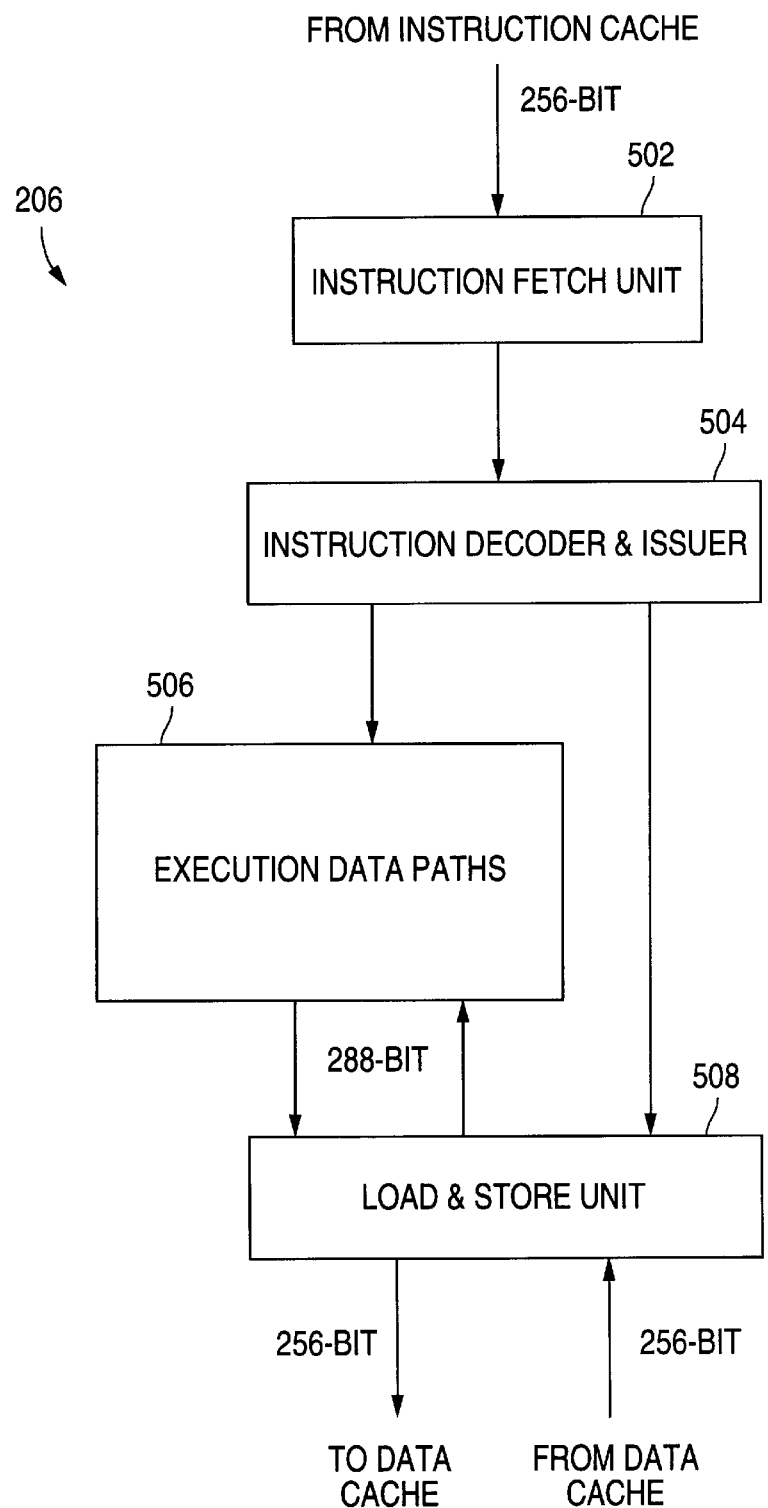
FIG. 8 is a schematic block diagram showing a vector processor in the multimedia signal processor illustrated in FIG. 3.

Referring to FIG. 8, the vector processor 206 has four functional blocks including an instruction fetch unit 502, an instruction decoder and issuer 504, an instruction execution data path 506, and a load and store unit 508. The instruction fetch unit 502 and the instruction decoder and issuer 504 are included in the vector processor 206 to allow the vector processor 206 to operate independently of the scalar processor 204.

The instruction fetch unit 502 prefetches instructions and processes control flow instructions such as Branch and Jump to Subroutine instructions. The instruction fetch unit 502 contains a 16-entry queue of prefetched instructions for the current execution stream and an eight-entry queue of prefetched instructions for the Branch target stream. The instruction fetch unit 502 receives up to eight instructions from the instruction cache in a cycle. The instruction decoder and issuer 504 decodes and schedules all instructions executed by the vector processor 206. The decoder processes one instruction in a cycle in the order of receipt from the instruction fetch unit 502, while the issuer schedules most instructions out-of-order depending on both the execution resource and operand data availability.

Figure 9:
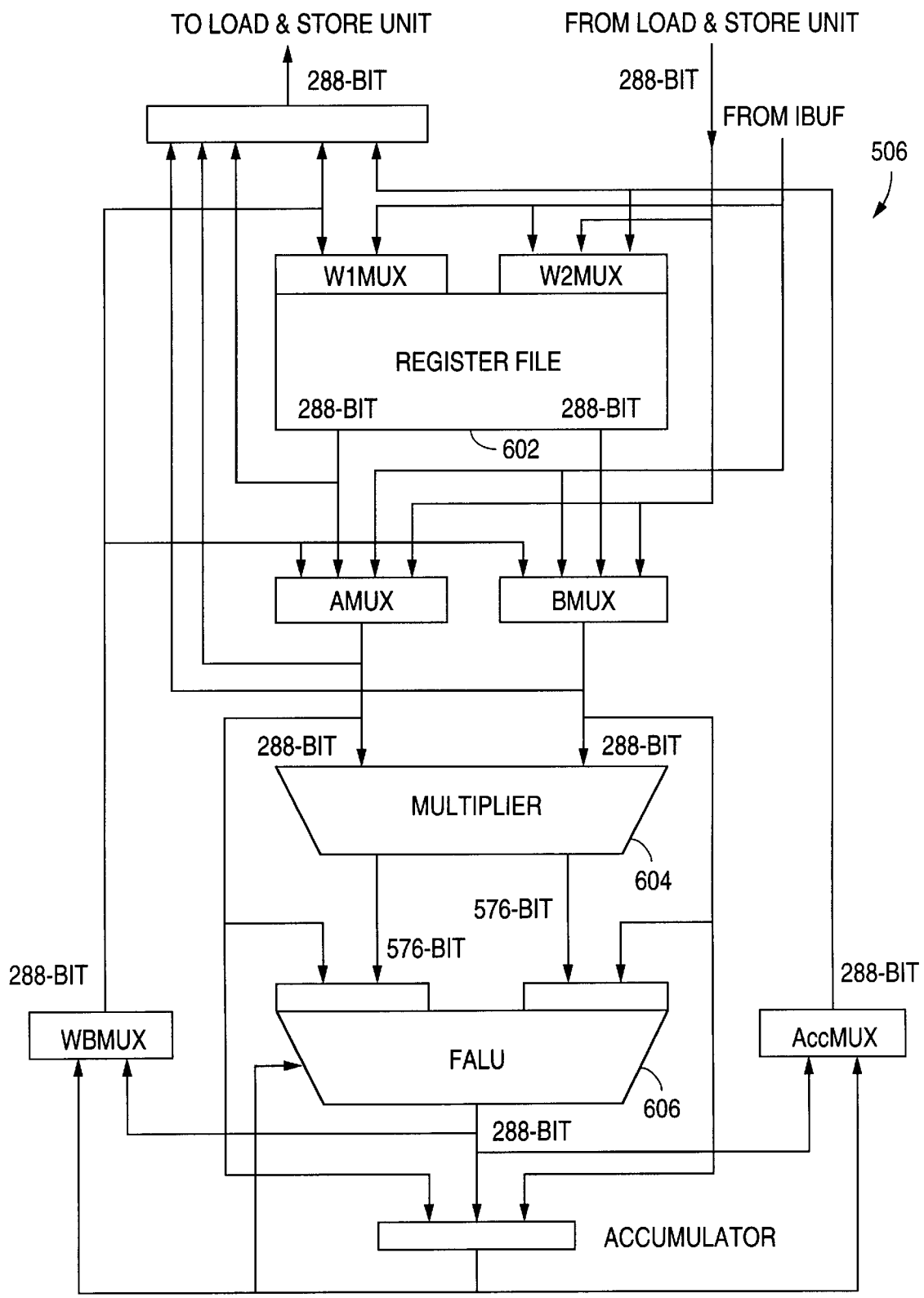
FIG. 9 is a schematic block diagram showing vector processor execution data paths of the vector processor illustrated in FIG. 8.

Referring to FIG. 9, the instruction execution data path 506 includes a four-port register file 602, eight 32×32 parallel multipliers 604, and eight 36-bit ALUs 606. The register file 602 supports two read operations and two write operations per cycle. The parallel multipliers 604 produce up to eight 32-bit multiplications in integer or floating point format, or sixteen 16-bit multiplications or thirty-two 8-bit multiplications per cycle. The ALUs 606 execute either eight 36-bit ALU operations in integer or floating point format, sixteen 16-bit ALU operations, or thirty-two 8-bit operations per cycle (for example, 12.5 ns).

The register file 602 includes a plurality of special-purpose registers and a plurality of return address registers. The special-purpose registers include a vector control and status register (VCSR), a vector program counter (VPC), a vector exception program counter (VEPC), a vector interrupt source register (VISRC), a vector and scalar processor synchronization register (VASYNC) and other registers such as various count, mask, overflow and breakpoint registers. The vector program counter (VPC) is the address of the next instruction to be executed by the vector processor 206.

Figure 10:
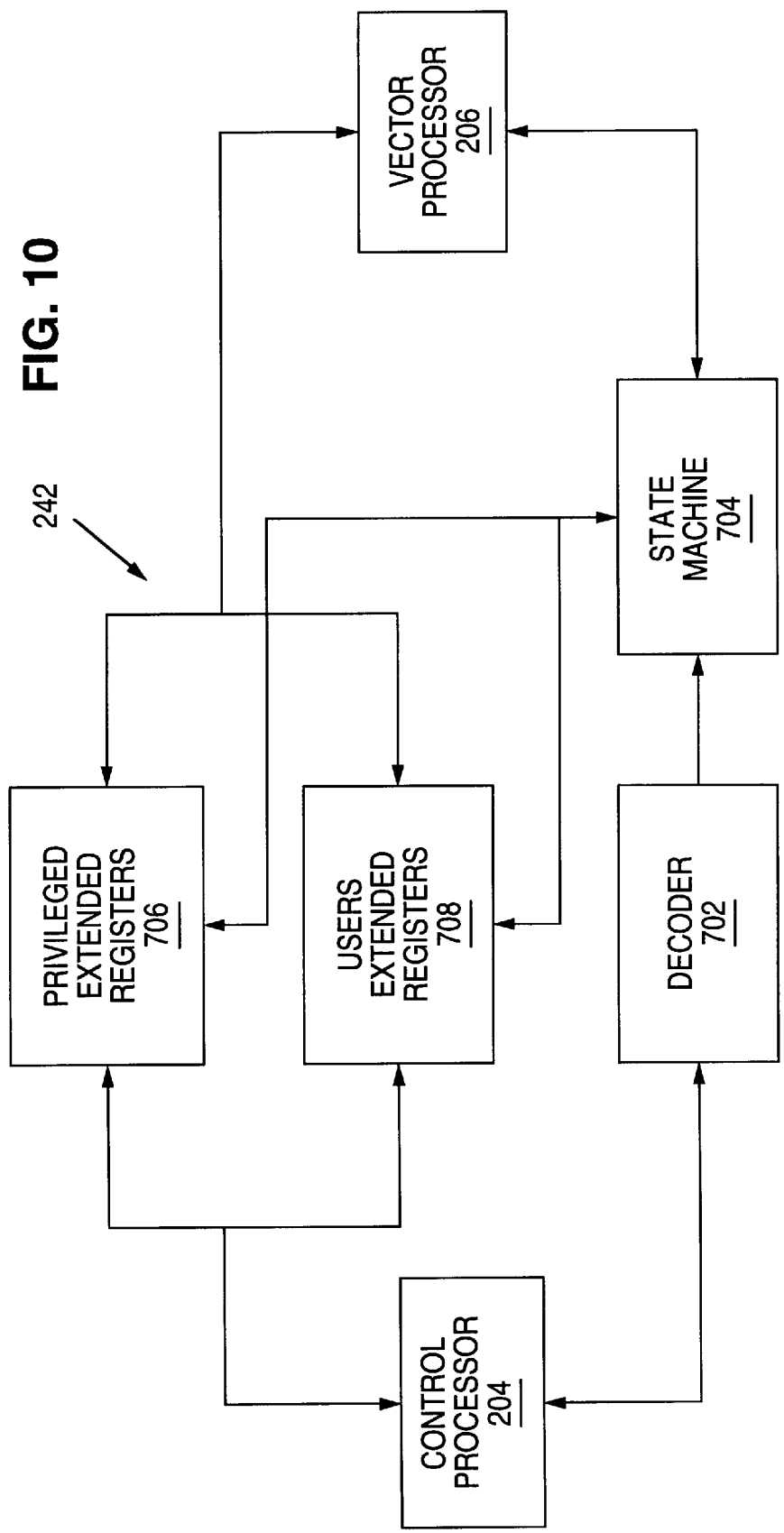
FIG. 10 is a schematic block diagram showing a coprocessor interface in the multimedia signal processor illustrated in FIG. 3.

A schematic block diagram of the coprocessor interface 242 is shown in FIG. 10. The coprocessor interface 242 supplements the functionality of the scalar processor 204, adding registers and logic functions for implementing instructions that extend the instruction set of the scalar processor 204. The coprocessor interface 242 includes registers for communicating between the scalar processor 204 and the vector processor 206. The coprocessor interface 242 also serves as a buffer for communicating data and signals between structures that operate at different clock rates. In one embodiment, the scalar processor 204 operates at a 40 MHz rate and the vector processor 206 executes at 80 MHz.

The coprocessor interface 242 includes a decoder 702, a state machine 704, a privileged extended register block 706, and a users extended register block 708. The registers in the privileged extended register block 706 and the users extended register block 708 are readable and writeable by the scalar processor 204 and by the vector processor 206. The decoder 702 decodes instructions of the scalar processor instruction set. The scalar processor instruction set includes instructions that are executable on the scalar processor 204 and extended instructions that are not executed by the scalar processor 204 but are instead executed by the coprocessor interface 242 to implement special coprocessor functionality. The decoder 702 decodes scalar processor instructions, detects extended instructions and supplies detected extension instructions to the state machine 704 for execution. The state machine 704 includes logic for implementing the extension instructions. The privileged extended register block 706 are extended registers which are accessed during execution of special instructions by the scalar processor 204.

Referring again to FIG. 3, the cache subsystem 208 includes a data cache 214 (for example, 5 KB), an instruction cache 216 (for example, 2 KB), and a cache ROM 218 (for example, 16 KB) and typically operates at the same speed as the vector processor 206 (80 MHz). In one embodiment, the cache subsystem 208 includes 1 Kbyte of instruction storage and 1 Kbyte of data storage for the scalar processor 204, 1 Kbyte of instruction storage and 4 Kbyte of data storage for the vector processor 206, and a shared 16 Kbyte of integrated instruction and data cache ROM for both the scalar processor 204 and the vector processor 206. The cache subsystem 208 interfaces to the scalar processor 204 through 32-bit data buses and interfaces to the vector processor 206 through 128-bit data buses. The cache ROM 218 includes uROM initialization software, self-test diagnostics software, various system management software, library routines and a cache for selected instructions and data constants. Specifically, the cache ROM 218 includes an instruction exception handler and input and output device interrupt handlers 0, 1, 2 and 3 for the scalar processor 204. The cache ROM 218 also includes a vector processor interrupt handler and a vector processor breakpoint exception handler which execute in the scalar processor 204.

The FBUS 210 interfaces to a plurality of FBUS peripherals including, for example, a 32-bit PCI bus interface 220, a 64-bit SDRAM memory controller 222, an 8-channel DMA controller 224, a customer ASIC logic block 226, and a memory data mover 228. The PCI bus interface 220 interfaces to the system bus 106 and operates, for example, at 33 MHz. The customer ASIC logic block 226 furnishes control logic for implementing custom functionality, as desired. The customer ASIC logic block 226, in one embodiment, supplies 10 Kgates including interfaces to various analog CODECs and customer-specific I/O devices. The memory data mover 228 transfers DMA data from the host processor 102 to SDRAM memory 230 which is local to the multimedia signal processor 104.

The I/O bus 212 interfaces to a plurality of I/O bus devices including, for example, a bit stream processor 232, a UART serial line 234, a timer circuit 236, an interrupt controller 238, and a special register 240. The bit stream processor 232 processes the video bit stream. The special register 240 is used for software-controlled initialization and interrupt handling.

Figure 11:
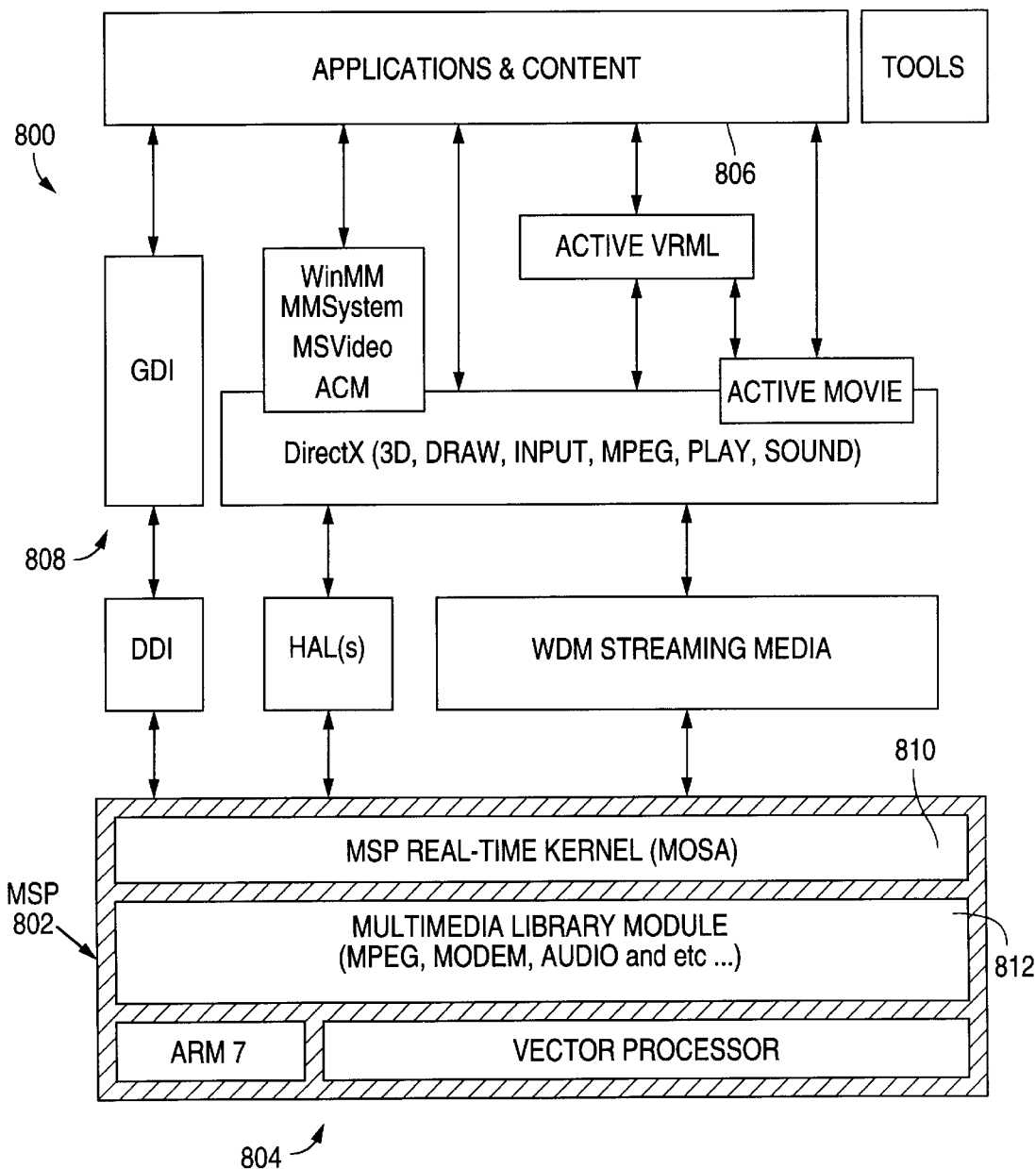
FIG. 11 is a schematic block diagram illustrating a firmware architecture of the multimedia signal processor.

Referring to FIG. 11, a schematic block diagram illustrates the software and firmware architecture 800 of the multimedia signal processor 104 including MSP system component software 802 executing on the multimedia signal processor 104 and PC applications and operating system software 808 executing on the host processor 102. The multimedia signal processor 104 is controlled by firmware including a vectorized-DSP firmware library 804 which executes on the vector processor 206 and a system management function block 806 which executes on the scalar processor 204. The a vectorized-DSP firmware library 804 and the system management function block 806 are included in MSP system component software 802. The architecture 800 advantageously separates signal processing functionality from host application control operations to simplify software development, improve software design management and reduce applications development and maintenance costs.

The MSP system component software 802 executes exclusively on the scalar processor 204 and includes an MSP real-time kernel 810, a multimedia library module 812, the system management function block 806 and the vectorized-DSP firmware library 804. The MSP real-time kernel 810 is typically responsible for interfacing to the host processor 102, resource management, I/O device handling and most interrupt and exception processing. The MSP real-time kernel 810 includes software for interfacing to Windows™ and Windows NT™ software executing in the host processor 102. The MSP real-time kernel 810 also includes software for selecting and downloading selected application firmware from the host processor 102, software for scheduling tasks for execution in the scalar processor 204 and the vector processor 206, and software for managing system resources of the multimedia signal processor 104 including memory and I/O devices. The MSP real-time kernel 810 includes software for synchronizing communication between tasks of the multimedia signal processor 104 and software for reporting MSP-related interrupt, exception and status conditions.

The vectorized-DSP firmware library 804 performs substantially all digital signal processing functions. The vectorized-DSP firmware library 804 also controls specific special interrupts such as a Coprocessor Interrupt which is issued by the scalar processor 204 to the vector processor 206, or a Hardware Stack Overflow Exception, which is generated within the vector processor 206.

The multimedia library module 812 performs communications-handling functions including data communication, MPEG video and audio, speech coding and synthesis, SoundBlaster™-compatible audio and the like. The MSP real-time kernel 810 is a real-time, robust, multitasking, pre-emptive operating system including enhancements which facilitate multimedia applications executing on the multimedia signal processor 104.

The PC applications and operating system software 808 executing in the host processor 102 controls the multimedia signal processor 104 by reading and writing MSP control and status registers via the system bus 106, and writing to shared data structures that are resident to the system memory 116 and resident to the multimedia signal processor 104.

MSP program execution begins with the scalar processor 204 which executes a first execution stream. The scalar processor 204 may initiate a second independent execution stream in the vector processor 206. Operations of the scalar processor 204 and the vector processor 206 are synchronized through specific coprocessor instructions that operate in the scalar processor 204, including STARTVP, INTVP and TESTVP instructions, and special instructions executing in the vector processor 206, including VJOIN and VINT instructions. Data transfer between the scalar processor 204 and the vector processor 206 are performed using data movement instructions executed in the scalar processor 204.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize a multiprocessor system including a Pentium host computer and a particular multimedia processor. Other processor configurations may be used in other embodiments.

What is claimed is:

1. An audio decoder in a multiprocessor multimedia system having a scalar processor and a vector processor comprising:
   a frame synchronization program code that executes on the scalar processor to synchronize an audio bitstream input signal;
   an information extraction program code that executes on the scalar processor to extract information from the audio bitstream, the extracted audio bitstream information including nonsequential sample data;
   a vectorizing program code that executes on the scalar processor to convert the nonsequential sample data to sequential sample data;
   a requantization program code that executes on the vector processor to requantize the sequential sample data; and
   a sub-band filtering program code that executes on the vector processor to generate a filtered audio sample output signal.

2. An audio decoder according to claim 1 wherein:
   the information extraction program code further includes:
      a program code that extracts header information from the audio bitstream;
      a program code that extracts bit allocation bits from the audio bitstream;
      a program code that extracts scalefactor selection information and a scalefactor from the audio bitstream; and
      a program code that extracts sample data from the audio bitstream; and
   the vectorizing program code further includes:
      a scalefactor vectorizing program code that transforms data in a scalefactor array from nonsequential data that is a function of a bit index into sequential data that is a function of sub-band number.

3. An audio decoder according to claim 2 wherein the program code that extracts scalefactor selection information and a scalefactor from the audio bitstream further comprises:
   a program code that extracts a scalefactor index from the audio bitstream;
   a program code that calculates a plurality of scalefactor coefficients based on the scalefactor index; and
   a program code that stores the scalefactor coefficients in a scalefactor array.

4. A audio decoder in a multiprocessor multimedia system according to claim 2 wherein the audio bitstream is an MPEG audio.

5. An audio decoder according to claim 1 wherein the vectorization program code further comprises:
   a program code that arranges a plurality of quantization coefficients as all-sequential data corresponding to a channel index and a sub-band number.

6. An audio decoder according to claim 5 wherein the quantization coefficients include a mask function array and a plurality of requantization coefficient data arrays.

7. An audio decoder according to claim 1 wherein the vectorization program code further comprises:
   a program code that arranges a plurality of quantization coefficient arrays, a scalefactor array and a masking data array as all-sequential data arrays corresponding to a channel index and a sub-band number,
   the arrays being arranged for usage by the requantization program code.

8. A audio decoder in a multiprocessor multimedia system according to claim 1 wherein the audio bitstream is an MPEG audio.

9. A method for decoding an audio bitstream operating in a multiprocessor multimedia system having a scalar processor and a vector processor comprising:
   receiving the audio bitstream;
   synchronizing the multiprocessor multimedia system to the incoming audio bitstream via a program code executing on the scalar processor;
   extracting information from the audio bitstream via a program code operating on the scalar processor;
   converting nonsequential sample data to sequential sample data via a vectorizing program code executing on the scalar processor;
   requantizing sample data via a program code executing on the vector processor; and
   sub-band filtering the sample data via a program code executing on the vector processor to generate filtered audio samples.

10. A method according to claim 9 wherein:
   the operation of extracting information from the audio bitstream further comprises:
      extracting header information from the audio bitstream;
      extracting bit allocation bits from the audio bitstream;
      extracting scalefactor selection information and a scalefactor from the audio bitstream; and
      extracting sample data from the audio bitstream the operation of converting nonsequential sample data to sequential sample data further includes:
         transforming data in a scalefactor array from nonsequential data that is a function of a bit index into sequential data that is a function of sub-band number.

11. A method according to claim 10 wherein the step of extracting scalefactor selection information and a scalefactor from the audio bitstream further comprises:
   extracting a scalefactor index from the audio bitstream;
   calculating a plurality of scalefactor coefficients based on the scalefactor index; and
   storing the scalefactor coefficients in a scalefactor array.

12. A method for decoding an audio bitstream according to claim 10 wherein the audio bitstream is an MPEG audio.

13. A method according to claim 9 wherein the operation of converting nonsequential sample data to sequential sample data further comprises:
   arranging a plurality of quantization coefficients as all-sequential data corresponding to a channel index and a sub-band number.

14. A method according to claim 13 wherein the quantization coefficients include a mask function array and a plurality of requantization coefficient data arrays.

15. A method according to claim 9 wherein the operation of converting nonsequential sample data to sequential sample data further comprises:
   arranging a plurality of quantization coefficient arrays, a scalefactor array and a masking data array as all-sequential data arrays corresponding to a channel index and a sub-band number,
   the arrays being arranged for usage by the program code for requantizing sample data.

16. A method for decoding an audio bitstream according to claim 9 wherein the audio bitstream is an MPEG audio.

17. A multiprocessor multimedia system comprising:
a scalar processor;
a vector processor coupled to the scalar processor;
an audio decoder program code that executes on the scalar processor and the vector processor in combination to decode an audio bitstream, the audio decoder program including:
a program code that receives the audio bitstream;
a frame synchronization program code that executes on the scalar processor to synchronize the audio bitstream;
an information extraction program code that executes on the scalar processor, the information extraction program code for extracting information from the audio bitstream, the extracted audio bitstream information including nonsequential sample data;
a vectorizing program code that executes on the scalar processor to convert the nonsequential sample data to sequential sample data;
a program code to requantize the sequential sample data, the program code executing on the vector processor; and
a sub-band filtering program code that executes on the vector processor to generate a filtered audio sample output signal.

18. A multiprocessor multimedia system according to claim 17 wherein:
the information extraction program code further comprises:
a program code that extracts header information from the audio bitstream;
a program code that extracts bit allocation bits from the audio bitstream;
a program code that extracts scalefactor selection information and a scalefactor from the audio bitstream; and
a program code that extracts sample data from the audio bitstream; and
the vectorizing program code further includes:
a scalefactor vectorizing program code that transforms data in a scalefactor array from nonsequential data that is a function of a bit index into sequential data that is a function of sub-band number.

19. A multiprocessor multimedia system according to claim 18 wherein the program code that extracts scalefactor selection information and a scalefactor from the audio bitstream further comprises:
a program code that extracts a scalefactor index from the audio bitstream;
a program code that calculates a plurality of scalefactor coefficients based on the scalefactor index; and
a program code that stores the scalefactor coefficients in a scalefactor array.

20. A multiprocessor multimedia system according to claim 18 wherein the audio bitstream is an MPEG audio.

21. A multiprocessor multimedia system according to claim 17 wherein the vectorization program code further comprises:
a program code that arranges a plurality of quantization coefficients as all-sequential data corresponding to a channel index and a sub-band number.

22. A multiprocessor multimedia system according to claim 21 wherein the quantization coefficients include a mask function array and a plurality of requantization coefficient data arrays.

23. A multiprocessor multimedia system according to claim 17 wherein the vectorization program code further comprises:
a program code that arranges a plurality of quantization coefficient arrays, a scalefactor array and a masking data array as all-sequential data arrays corresponding to a channel index and a sub-band number,
the arrays being arranged for usage by the program code for requantizing sample data.

24. A multiprocessor multimedia system according to claim 17 wherein the audio bitstream is an MPEG audio.

25. A computer program product that executes on a computer system including a scalar processor and a vector processor, the computer program product comprising:
a computer usable medium having computable readable code embodied therein including:
a frame synchronization routine executable on the scalar processor to synchronize an audio bitstream;
an information extraction routine executable on the scalar processor, the information extraction program code extracting information from the audio bitstream, the extracted audio bitstream information including nonsequential sample data;
a vectorizing routine executable on the scalar processor to convert the nonsequential sample data to sequential sample data;
a requantizing routine executable on the vector processor to requantize the sequential sample data; and
a sub-band filtering routine executable on the vector processor to supply filtered audio samples.

26. A computer program product according to claim 25 wherein:
the information extraction routine further includes:
a header information extracting routine that extracts header information from an audio bitstream;
a bit extracting routine that extracts bit allocation bits from the audio bitstream;
a scalefactor extracting routine that extracts scalefactor selection information and a scalefactor from the audio bitstream; and
a sample data extracting routine that extracts sample data from the audio bitstream; and
the vectorizing routine further includes:
a scalefactor vectorizing routine that transforms data in a scalefactor array from nonsequential data that is a function of a bit index into sequential data that is a function of sub-band number.

27. A computer program product according to claim 25 wherein:
the scalefactor extracting routine further comprises:
a routine that extracts a scalefactor index from the audio bitstream;
a routine that calculates a plurality of scalefactor coefficients based on the scalefactor index; and
a routine that stores the scalefactor coefficients in a scalefactor array.

28. A computer program product according to claim 26 wherein the audio bitstream is an MPEG audio bitstream.

29. A computer program product according to claim 25 wherein the vectorization routine further comprises:
a routine that arranges a plurality of quantization coefficients as all-sequential data corresponding to a channel index and a sub-band number.

30. A computer program product according to claim 29 wherein the quantization coefficients include a mask function array and a plurality of requantization coefficient data arrays.

31. A computer program product according to claim 29 wherein the vectorization routine further comprises:
   a routine that arranges a plurality of quantization coefficient arrays, a scalefactor array and a masking data array as all-sequential data arrays corresponding to a channel index and a sub-band number,
   the arrays being arranged for usage by the requantization routine.

32. A computer program product according to claim 25 wherein the audio bitstream is an MPEG audio bitstream.

33. A computer system comprising:
   a scalar processor;
   a vector processor coupled to the scalar processor;
   computer program product that executes on a computer system including a scalar processor and a vector processor, the computer program product including
      a computer usable medium having computable readable code embodied therein including:
         a frame synchronization routine that executes on the scalar processor to synchronize an audio bitstream;
         an information extraction routine that executes on the scalar processor, the information extraction routine extracting information from the audio bitstream, the extracted audio bitstream information including nonsequential sample data;
         a vectorizing routine that executes on the scalar processor, the vectorizing routine converting the nonsequential sample data to sequential sample data;
         a requantizing routine that executes on the vector processor to requantize the sequential sample data; and
         a sub-band filtering routine that executes on the vector processor to supply filtered audio samples.

34. A computer program product according to claim 33 wherein:
   the information extraction routine further includes:
      a header information extracting routine that extracts header information from the audio bitstream;
      a bit extracting routine that extracts bit allocation bits from the audio bitstream;
      a scalefactor extracting routine that extracts scalefactor selection information and a scalefactor from the audio bitstream; and
      a sample data extracting routine that extracts sample data from the audio bitstream; and
   the vectorizing routine further includes:
      a scalefactor vectorizing routine that transforms data in a scalefactor array from nonsequential data that is a function of a bit index into sequential data that is a function of sub-band number.

35. A computer program product according to claim 34 wherein the audio bitstream is an MPEG audio bitstream.

36. A computer program product according to claim 33 wherein:
   the scalefactor extracting routine further comprises:
      a routine that extracts a scalefactor index from the audio bitstream;
      a routine that calculates a plurality of scalefactor coefficients based on the scalefactor index; and
      a routine that stores the scalefactor coefficients in a scalefactor array.

37. A computer program product according to claim 33 wherein the vectorization routine further comprises:
   a routine that arranges a plurality of quantization coefficients as all-sequential data corresponding to a channel index and a sub-band number.

38. A computer program product according to claim 37 wherein the quantization coefficients include a mask function array and a plurality of requantization coefficient data arrays.

39. A computer program product according to claim 37 wherein the vectorization routine further comprises:
   a routine that arranges a plurality of quantization coefficient arrays, a scalefactor array and a masking data array as all-sequential data arrays corresponding to a channel index and a sub-band number,
   the arrays being arranged for usage by the sequential sample data requantizating routine.

40. A computer system according to claim 33 wherein the audio bitstream is an MPEG audio bitstream.

* * * * *